US010633198B2

(12) United States Patent
Bringewatt et al.

(10) Patent No.: US 10,633,198 B2
(45) Date of Patent: Apr. 28, 2020

(54) METHOD AND APPARATUS FOR FEEDING ITEMS OF LAUNDRY TO A LAUNDRY-TREATMENT DEVICE, IN PARTICULAR TO AT LEAST ONE LOADING CONVEYOR (71) Applicant: Herbert Kannegiesser GmbH, Vlotho (DE)

(72) Inventors: Wilhelm Bringewatt, Porta Westfalica (DE); Engelbert Heinz, Vlotho (DE); Jürgen Sielermann, Heubach (DE)

(73) Assignee: Herbert Kannegiesser GmbH, Vlotho (DE)

( * ) Notice: Subject to any disclaimer, the term of this patent is extended or adjusted under 35 U.S.C. 154(b) by 113 days.

(21) Appl. No.: 16/017,527

(22) Filed: Jun. 25, 2018

(65) Prior Publication Data
US 2018/0370737 A1 Dec. 27, 2018

(30) Foreign Application Priority Data
Jun. 26, 2017 (DE) .......................... 10 2017 005 954

(51) Int. Cl.
*B65G 47/90* (2006.01)
*D06F 95/00* (2006.01)
*D06F 67/04* (2006.01)
*B25J 9/00* (2006.01)
*B65G 15/30* (2006.01)
*B65G 47/04* (2006.01)
*D06F 71/38* (2006.01)

(52) U.S. Cl.
CPC ............ *B65G 47/90* (2013.01); *B25J 9/0093* (2013.01); *B65G 15/30* (2013.01); *B65G 47/04* (2013.01); *D06F 67/04* (2013.01); *D06F 95/00* (2013.01); *D06F 71/38* (2013.01)

(58) Field of Classification Search
CPC .......... D06F 67/04; D06F 95/00; B65G 47/90
See application file for complete search history.

(56) References Cited

U.S. PATENT DOCUMENTS

| 4,050,173 A * | 9/1977 | Olsen ...................... D06F 67/04 38/143 |
| 5,339,949 A | 8/1994 | Jensen |
| 6,287,066 B1 * | 9/2001 | Heinz ..................... D06F 95/00 198/455 |

(Continued)

FOREIGN PATENT DOCUMENTS

| DE | 102014017477 A1 | 6/2016 |
| EP | 2998434 A1 | 3/2016 |
| JP | 2010-273 732 A | 12/2010 |

OTHER PUBLICATIONS

Deutsches Patent—Und Markenamt (German Patent and Trademark Office), Recherchenbericht (search in a related application), Sep. 6, 2017.

*Primary Examiner* — Thomas Randazzo
(74) *Attorney, Agent, or Firm* — Laurence P. Colton; Smith Tempel Blaha LLC (57) ABSTRACT A method and apparatus for a transfer operation of items of laundry to be automated by a handling device, which is designed for example in the form of a handling robot. Up until now, items of laundry have been transferred usually manually from a supply conveyor to loading conveyors of, for example, feeding machines. This is work-intensive and time-consuming.

20 Claims, 4 Drawing Sheets (56) References Cited

U.S. PATENT DOCUMENTS

| | | | | |
|---|---|---|---|---|
| 8,028,444 B2* | 10/2011 | Heinz | .................... | D06F 95/00 |
| | | | | 38/143 |
| 8,142,129 B2* | 3/2012 | Sielermann | ............ | D06F 67/04 |
| | | | | 198/465.4 |
| 9,187,253 B2* | 11/2015 | Olivieri | .................. | B65G 17/20 |
| 9,988,220 B2* | 6/2018 | Sielermann | ............ | D06F 67/04 |
| 2006/0191170 A1* | 8/2006 | Jensen | .................... | D06F 67/04 |
| | | | | 38/143 |
| 2006/0191171 A1* | 8/2006 | Jensen | .................... | D06F 67/04 |
| | | | | 38/143 |
| 2007/0068433 A1* | 3/2007 | Nielsen | .................. | D06F 67/04 |
| | | | | 112/141 |
| 2016/0145055 A1* | 5/2016 | Sielermann | ............ | B65G 47/90 |
| | | | | 414/751.1 |

* cited by examiner

METHOD AND APPARATUS FOR FEEDING ITEMS OF LAUNDRY TO A LAUNDRY-TREATMENT DEVICE, IN PARTICULAR TO AT LEAST ONE LOADING CONVEYOR

CROSS-REFERENCE TO RELATED APPLICATIONS

This application claims priority on and the benefit of German Patent Application No. 10 2017 005 954.3 having a filing date of 26 Jun. 2017

BACKGROUND OF THE INVENTION

Technical Field

The invention relates to a method for feeding items of laundry to at least one loading conveyor, wherein a respective separated item of laundry is transferred to the at least one loading conveyor. The invention also relates to an apparatus for feeding items of laundry to a laundry-treatment device having a supply conveyor and a feeding machine, which has at least one loading conveyor.

Prior Art

Items of laundry, to be precise in particular flat items of laundry, are fed individually to a laundry-treatment device, for example to a mangle, for further processing or treatment. Rather than being fed directly to the laundry-treatment device, the items of laundry are preferably fed to at least one loading conveyor. It is possible for the loading conveyor to be a constituent part of the laundry-treatment device, but also of a feeding machine, which is often arranged upstream of the laundry-treatment device.

It is usually the case that individual items of laundry are fed manually by operators, to the respective loading conveyor of the loading-treatment device or of the feeding machine. Such manual tasks mean that the feed rate is limited. Moreover, these tasks are laborious for the operator to perform.

BRIEF SUMMARY OF THE INVENTION

The object of the invention is to provide a method and an apparatus for feeding items of laundry in an automated manner to a laundry-treatment device and/or to at least one loading conveyor.

A method for achieving this object is a method for feeding items of laundry to at least one loading conveyor, wherein a respective separated item of laundry is transferred to the at least one loading conveyor, wherein the respective item of laundry is transferred to the respective loading conveyor by a handling device. Accordingly, provision is made for the respective item of laundry to be transferred to the at least one loading conveyor by means of at least one handling device. This can give rise to a gap-free, automated or mechanised chain, which is no longer interrupted by tasks being performed manually because the at least one handling device performs the task of transferring the individual items of laundry to the respective loading conveyor.

The handling device preferably receives the respective item of laundry in the state in which the item of laundry is retained at two corners, in particularly diagonally opposite corners, and in which preferably the item of laundry hangs down freely from the retained corners. This means that each item of laundry is moved into an optimum position in order to be reliably received automatically by the handling device.

Provision may also be made for the handling device to grip the respective item of laundry between the corners of a hanging-down periphery. This takes place preferably such that the handling device grips an inner region of the periphery, preferably a portion of the periphery. This periphery may be any desired periphery, preferably a periphery of which one corner has been retained, the adjacent corner hanging down freely. As an alternative, it is possible for the two adjacent corners of the peripheral portion which is to be gripped to hang down freely beneath the other two, retained corners. The handling device can grip the hanging-down peripheral portion of the item of laundry particularly quickly and reliably. This applies, in particular, when a central or middle portion of the hanging-down periphery of the respective item of laundry is gripped, or is to be gripped, by the handling device.

In particular, provision may be made for the hanging-down periphery or the edge of the item of laundry to run in an at least largely rectilinear manner. This makes it easier for the handling device to grip the item of laundry reliably and specifically at the desired location.

A possible development of the method provides for a double clip of the handling device to receive the peripheral portion of the respective item of laundry. For this purpose, the double clip preferably has two spaced-apart mouths, which grip, and thereafter retain, opposite ends of the peripheral portion. It is thus possible for the desired peripheral region or peripheral portion to be retained, to be precise preferably in a stretched state or at least in a more or less stretched state, between the spaced-apart mouths of the double clip. This makes it easier for the item of laundry to be transferred, with the peripheral portion retained between the mouths of the double clip, to the handling device and, by the latter, to a subsequent laundry-treatment device.

The handling device preferably transfers the respective item of laundry to the single loading conveyor, or a selected loading conveyor, by the item of laundry being positioned on the relative loading conveyor or hung on the loading conveyor. Such a transfer can be performed automatically, in a particularly reliable manner, by a handling device.

If a plurality of loading conveyors are provided, and preferably one beside the other, it is possible for a single handling device to transfer successive items of laundry alternately to different, selected loading conveyors. In the simplest case, the handling device transfers successive items of laundry in a defined order to respectively different loading conveyors. The items of laundry are then distributed evenly over the individual loading conveyors. It is also conceivable, however, for successive items of laundry to be distributed unevenly over the loading conveyors.

In the case of a preferred configuration of the method, the handling device positions the relevant item of laundry on an initial region of the preferably narrow conveyor belt of the respective loading conveyor. This type of transfer is particularly suitable for handling devices and can also be performed quickly and reliably.

A possible development of the method is for the operation of the respective individual item of laundry being gripped and/or received by the handling device to be controlled on the basis of data obtained by way of sensors and/or signals recorded by at least one imaging device. In particular, there is contactless detection at least in part, preferably in full, of the position and/or orientation of that periphery of the item of laundry hanging down from the retained corners, or of that edge of the same which hangs down freely under gravitational force and/or forms freely in space, which is to be received and gripped, in the peripheral portion or edge region, by the handling device, preferably the double clip thereof. It is thus possible for the handling device to be moved in a specific manner up to the relevant edge region or peripheral portion and to grasp the same in a reliable manner.

An apparatus for solving the object mentioned in the introduction is an apparatus for feeding items of laundry to a laundry-treatment device having a supply conveyor and a feeding machine, which has at least one loading conveyor, wherein a handling device is arranged between the supply conveyor and the at least one loading conveyor. This apparatus is distinguished in that a handling device is arranged between a preliminary conveyor or supply conveyor and the at least one loading conveyor. The handling device thus interlinks the supply conveyor or preliminary conveyor with the respective loading conveyor. This ensures reliable automated feeding of the items of laundry to the respective loading conveyor. It is possible for the at least one loading conveyor to be a constituent part of the subsequent laundry-treatment device or to be arranged upstream of the same.

The supply conveyor of the apparatus has at least one pair of clips, each clip being displaceable preferably independently of the other, for retaining two corners of a respective item of laundry. The corners are diagonally opposite corners or adjacent corners of a frame of the item of laundry. The item of laundry can thus hang down freely from the retained corners, as a result of which at least one periphery of the item of laundry forms beneath the supply conveyor, said periphery being freely accessible by the handling device for easy and reliable gripping.

The apparatus can be developed such that the supply conveyor is assigned at least one imaging device and/or sensors, which detect in a contactless manner preferably the position and/or orientation of at least that periphery of the item of laundry which is to be automatically approached, and gripped, by the handling device and hangs down in a freely accessible manner from the clips of the supply conveyor. The signals or data from the sensors or imaging device can be transferred to a control means, which controls the handling device such that the latter can specifically approach, and grasp, the relevant periphery of the item of laundry. The periphery is preferably a peripheral portion of the item of laundry which is located between adjacent corners of a periphery.

According to a preferred configuration of the apparatus, one end of a gripping arm of the handling device is assigned a double clip having two spaced-apart mouths. This double clip can grip a peripheral portion of the respective item of laundry, to be precise preferably such that the peripheral portion is retained in a stretched state or at least in a more or less stretched state between the mouths of the double clip. This makes it easier for the item of laundry to be transferred, with the peripheral portion, to the relevant loading conveyor.

In the case of an advantageous configuration of the apparatus, the or each loading conveyor is designed in the form of a belt conveyor. In particular, all the belt conveyors, arranged preferably one beside the other, are of identical design. It is at least the case that the belt conveyors of all the loading conveyors are of equal width. It is thus possible for the double clips of the handling device to set down the items of laundry on different loading conveyors, to be precise preferably in the same way.

A preferred possible development of the apparatus provides for the or each loading conveyor, which is designed in the form of a belt conveyor, to have a narrow conveyor belt, of which the upper strand is assigned to a location where the respective item of laundry is set down by the handling device. The width of the respective conveyor belt here is preferably somewhat smaller than the distance between the two mouths of the double clip of the handling device. The handling device can reliably set down the relevant item of laundry at the set-down location of each loading conveyor by way of the preferably at least partially stretched peripheral portion retained between the two mouths of the double clip.

The handling device is preferably one which has a clip, or a similar gripping means, which can be moved multiaxially in space by a gripping arm. For example, it is possible for the handling device to be designed, for this purpose, in the form of a robot.

BRIEF DESCRIPTION OF THE DRAWINGS

Preferred exemplary embodiments of the apparatus will be explained in more detail hereinbelow with reference to the drawings, in which.

DETAILED DESCRIPTION OF PREFERRED EMBODIMENTS

Figure 1:
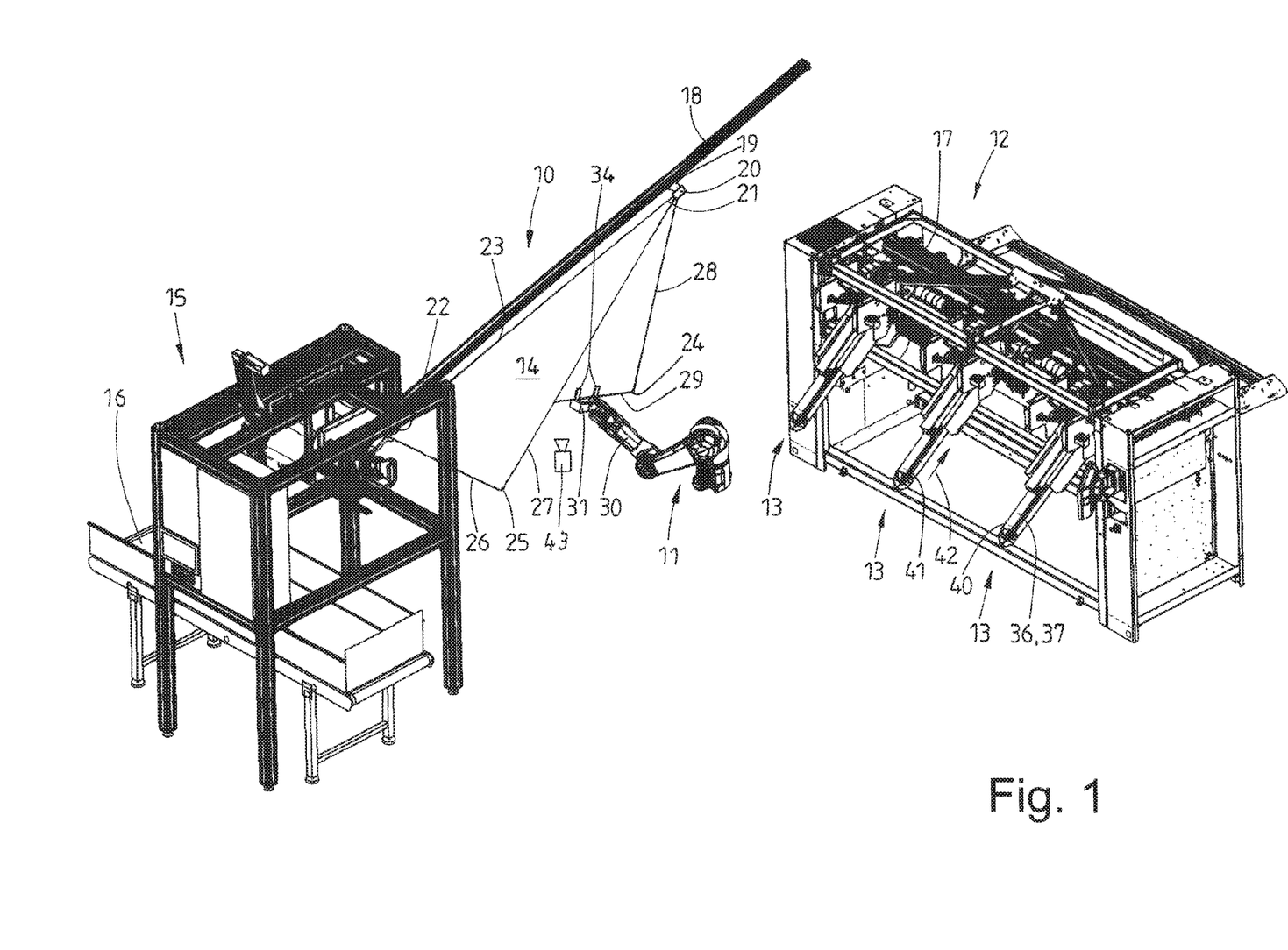
FIG. 1 shows a perspective illustration of the apparatus.

FIG. 1 illustrates a supply conveyor 10, a handling device 11 and a feeding machine 12, which has three loading conveyors 13 of the apparatus. FIG. 1 also shows an item of laundry 14 hanging on the supply conveyor 10.

FIG. 1 further shows a separating device 15 upstream of the supply conveyor 10. The separating device 15 is able to draw a respective individual item of laundry 14 out of a laundry-storage means (not shown), which is transported up to the separating device 15 by a conveyor 16.

The three loading conveyors 13, which are spaced apart equally one beside the other on the front side of the feeding machine 12, are of identical design. As an alternative, it is also possible for more or fewer than three loading conveyors 13, possibly also just a single leading conveyor 13, to be arranged upstream of the feeding machine 12.

The respective loading conveyor 13 feeds an item of laundry 14 to a spreading device 17 of the feeding machine, and the spreading device spreads out the item of laundry 14 in a transversely directed manner. The spread-out item of laundry 14 is then fed to a supply conveyor of a laundry-treatment device, for example a mangle, which follows the feeding machine 12. It is possible for the loading conveyors 13, or the at least one loading conveyor 13, to be a constituent part of a different laundry machine or to be located directly upstream of one such, if there is no need for a feeding machine 12.

Figure 2:
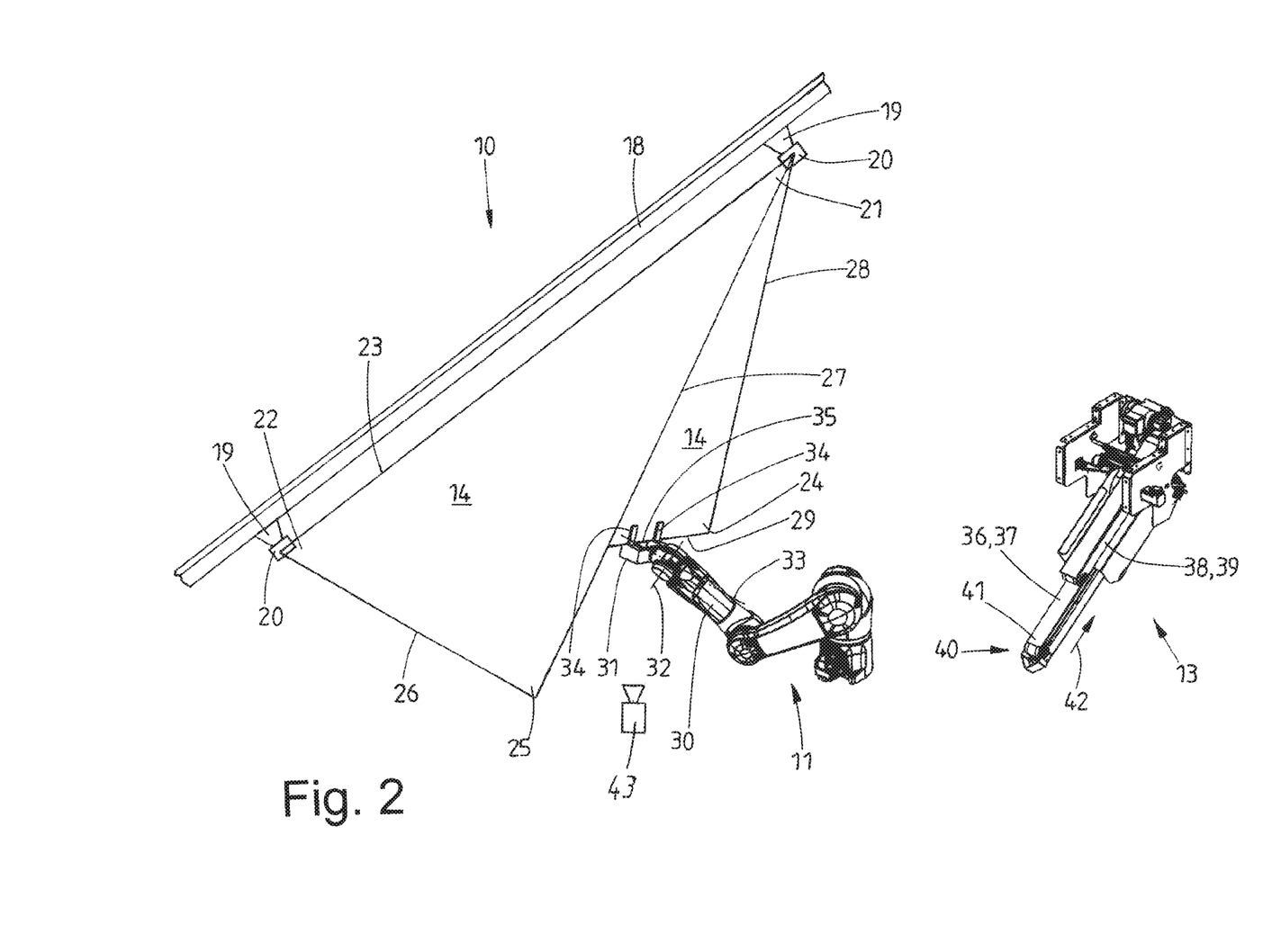
FIG. 2 shows parts of the apparatus from FIG. 1, namely an item of laundry, which is hanging on a supply conveyor, a handling device and loading conveyors of a feeding machine.

The supply conveyor 10 has a conveying rail 18, which in the exemplary embodiment shown is rectilinear and has a slight upward incline. Two clip carriages 19 can be displaced in or on the conveying rail 18, each of said carriages having a clip 20 located beneath the conveying rail 18. The two clips 20 of the clip carriages 19 form a pair of clips for retaining two corners 21, 22 of the item of laundry 14. In the exemplary embodiment shown, these are diagonally opposite corners 21, 22 of the item of laundry 14. The clip carriages 19 can be displaced along the conveying rail 18 by drives assigned to the conveying rail 18, for example by circulating conveying chains, conveying belts or the like. In the exemplary embodiment shown, the clip carriages 19 can be displaced independently of one another. This can be achieved by an independent drive assigned to each clip carriage 19, but also by a drive belonging only to the leading clip carriage 19, having the clip 20 which retains the corner 21. The trailing clip carriage 19 is then pulled along by the item of laundry 14, which is retained at the two corners 21, 22. In the same way as with the two clip carriages 19 being driven independently, this results in the item of laundry 14 being stretched out between the corners 21, 22, which are retained in the clips 20. In the exemplary embodiment shown, a diagonal of the item of laundry 14 is pulled tight at the points where the clips 20 retain diagonally opposite corners 21, 22 of the item of laundry 14. The rest of the item of laundry 14 hangs down freely beneath the diagonal (FIGS. 1 and 2).

It is also possible for the supply conveyor 10 to be designed in a manner other than that described above and shown in the figures, in particular for it to follow a different course. The critical factor is for the supply conveyor 10 to perform the above-described transporting task and to establish an ideally rectilinear line of connection between the corners 21, 22, which are retained by the clips 20.

A rectilinear, preferably stretched, diagonal 23 forms between the clips 20 as a result of the diagonally opposite corners 21 and 22 of the item of laundry 14 being retained by the clips 20. Two halves of the item of laundry, each half constituting a triangle, hang down freely from said diagonal, to be precise such that they are located in a vertical plane beneath the conveying rail 18. Each of these two triangles is formed by the two corners 21 and 22 retained by the clips 20, and a respective free corner 24 or 25, which hangs down. This results in four rectilinear, or more or less rectilinear, peripheries 26 to 29 forming beneath the conveying rail 18 and the clips 20, which can be displaced thereon. The periphery 26 is located between the free corner 25 and the corner 22 which is retained in a clip 20. The periphery 27 is located between the free corner 25 and the corner 21, which is retained in the other clip 20. The third periphery 28 is located between said corner 21 and the further free corner 24. Finally, the fourth periphery 29 extends between the free corner 24 and the corner 22 which is retained in the trailing clip 20 (FIGS. 1 and 2).

The handling device 11 is located between the supply conveyor 10 and the respective loading conveyor 13, that is in relation to the direction in which the item of laundry 14 is fed to the relevant loading conveyor 13. Said handling device is designed preferably (as illustrated in the figures) in the form of a commercially available industrial robot. However, the invention is not restricted to an industrial robot.

The handling device 11 has a number of axes appropriate to allow its gripping arm 30, which has a free end, to move the item of laundry 14 in three-dimensional space and to rotate and/or to pivot the same. A clip, which in the exemplary embodiment shown is a double clip 31, is arranged at the free end of the gripping arm 30 of the handling device 11. The double clip 31 can be repositioned at the end of the gripping arm 30, for example it can be pivoted about a pivot axis 32, which runs transversely to the longitudinal center axis of the gripping arm 30, and/or it can be rotated about an axis of rotation 33, which runs transversely through the pivot axis 32. The double clip 31 has two spaced-apart, preferably parallel halves, each with a mouth 34. As a result, when the double clip 31 is closed, a portion 35 of any desired periphery 26, 27, 28 or 29 of the respective item of laundry 14 can be clamped firmly in a stretched state, and thus retained, between the spaced-apart clip mouths 34.

The handling device 11, which in the exemplary embodiment illustrated is designed in the form of an industrial robot, can be rotated or pivoted, this including the ability of the double clip 31 to rotate and/or pivot at the free end of the gripping arm 30, about such a number of axes that the item of laundry 14 can be moved from the supply conveyor 10 into a position of transfer to the loading conveyor 13, which is ready or provided, and free, in each case for this purpose, and can be transferred to the loading conveyor 13.

Each of the identically designed loading conveyors 13 has a lower, relatively long conveyor belt 36, which can be driven in circulation, and an upper, shorter conveyor belt 38, part of which is arranged above an upper strand 37 of the conveyor belt 36. The upper conveyor belt 38 can be driven in circulation independently. It is also conceivable for the conveyor belt 38 to be carried along by virtue of its lower strand 39 butting against the upper strand 37 of the conveyor belt 36.

An initial section of the upper, shorter conveyor belt 38 is set back with respect to a free, front end 40 of the lower conveyor belt 36, as seen in relation to the direction in which the upper strand 37 of said lower conveyor belt runs to the spreading device 17 of the feeding machine 12, namely in the transporting direction 42 of the respective loading conveyor 13. This means that the upper strand 37 of the conveyor belt 36 is free, along the initial section, to form a supporting region 41 for the item of laundry 14. The handling device 11 can position the relevant item of laundry 14, by way of the front peripheral portion 35, on said supporting region 41, and therefore the periphery 29 is positioned in a U-shaped manner on the supporting region 41 by the double clip 31 of the handling device 11.

In the exemplary embodiment shown, the loading conveyors 13 are inclined in equal measure, to be precise such that the upper strand 37 of the conveyor belt 36 runs with a slight upward incline in the direction of the spreading device 17. It is also conceivable for the loading conveyors 13 to run horizontally or to be directed downwards in the direction of the spreading device 17.

At least the lower conveyor belts 36 of the loading conveyors 13 are of relatively narrow design. As a result, at least the conveyor belt 36 of the respective loading conveyor 13, said conveyor belt forming the supporting region 41, has a width which is somewhat smaller than the distance between the two mouths 34 of the double clip 31 of the handling device 11. It is thus possible, when the item of laundry 14 is being positioned on the supporting region 41 of the upper strand 37 of the lower conveyor belt 36, for each mouth 34 of the double clip 31 to be moved along opposite outer peripheries of the conveyor belt 36, in particular of the upper strand 37 thereof, without colliding with the upper strand 37, in particular, the longitudinal peripheries thereof.

The method according to the invention will be explained hereinbelow with reference to the above-described apparatus:

An individual item of laundry 14, or an item of laundry 14 which has previously been separated by the separating device 15, is advanced to the handling device 11 by the supply conveyor 10. Two clips 20 of the supply conveyor 10 here retain diagonally opposite corners 21, 22 of the item of laundry 14.

The item of laundry 14 is displaced by the clip carriages 19 such that the latter pull apart the corners 21, 22, which are retained by the clips 20, and a diagonal 23 of the item of laundry 14 is thus stretched out, by way of the clips 20, beneath the conveying rail 18. This results in the formation, beneath the clips 20 and the diagonal 23, of two triangles of the item of laundry 14, the triangles hanging down in a stretched-out state, with corners 24 and 25 hanging down freely from the clips 20. This means that approximately rectilinear peripheries 26, 27, 28 and 29 of the item of laundry 14 form beneath the supply conveyor 10.

The handling device 11, which in the exemplary embodiment shown is a commercially available robot or industrial robot, can grip a desired periphery 26, 27, 28 or 29 of the item of laundry 14, which hangs down freely beneath the supply conveyor 10 with its diagonal 23 in a stretched state. In the exemplary embodiment shown, the double clip 31 of the handling device 11 grips a central or near-central portion 35 of the periphery 29 of the item of laundry 14. It would be just as possible—if desired—for the double clip 31 to grip a different periphery 26, 27 or 28 of the item of laundry 14.

It would also be possible for the clips 20 of the supply conveyor 10 to stretch out the item of laundry 14 at two adjacent corners of a periphery. The item of laundry 14 would then have its square or rectangular surface area hanging in a spread-out state beneath the clips 20 of the conveying rail 18 of the supply conveyor 10 and one of the three hanging-down peripheries of the item of laundry 14 would be gripped by the double clip 31 of the handling device 11.

The handling device 11, in particular the double clip 31 thereof, is advanced in a specific manner, by a control means, to the periphery 29, which is to be gripped centrally or near-centrally and belongs to the item of laundry 14 hanging beneath the supply conveyor 10. For this purpose, the dimensions, direction and/or position at least of the periphery 29 to be gripped of the item of laundry 14 are/is sensed in a contactless manner by at least one imaging device 43 or sensors. The imaging device 43 may be, for example, a single three-dimensional camera or also more than one two-dimensional cameras. The signals generated by the imaging device 43 or the sensor arrangement are fed to a control means, which processes the signals such that the double clip 31 can advance up to the center, or a near-central region, of the periphery 29 and can then be clamped firmly by virtue of the two mouths 34 of the double clip 31 being closed. In the exemplary embodiment shown, in which it is a lower periphery 29 of the item of laundry 14 which is to be grasped, it is upwardly oriented openings of the mouths 34 of the double clip 31 which are advanced to the periphery 29 from beneath. The arms of the handling device 11 are appropriately pivoted and/or rotated in the process. In particular, the double clip 31 at the free end of the gripping arm 30 is pivoted and/or rotated about the axis of rotation 33 such that the peripheral portion which is to be gripped can reach the desired location in the open clip mouths 34.

Once the clip mouths 34 have been closed, the double clip 31 retains a portion 35 of the periphery 29 of the item of laundry 14 between the mouths. Since the peripheral portion 35 is gripped as the periphery 29 hangs in a rectilinear manner beneath the supply conveyor 10, the peripheral portion 35 is retained in a rectilinear manner, or slightly stretched state, between the mouths 34 of the double clip 31.

Once the handling device 11 has gripped the portion 35 of the periphery 29 of the item of laundry 14 by way of the double clip 31, and the double clip 31 has possibly been pivoted upwards to some extent by the handling device 11, the item of laundry 14 is released from the supply conveyor 10 by virtue of the two clips 20, which retain the corners 21 and 22, being opened. The item of laundry 14 then hangs just on the double clip 31 of the handling device 11.

Figure 3:
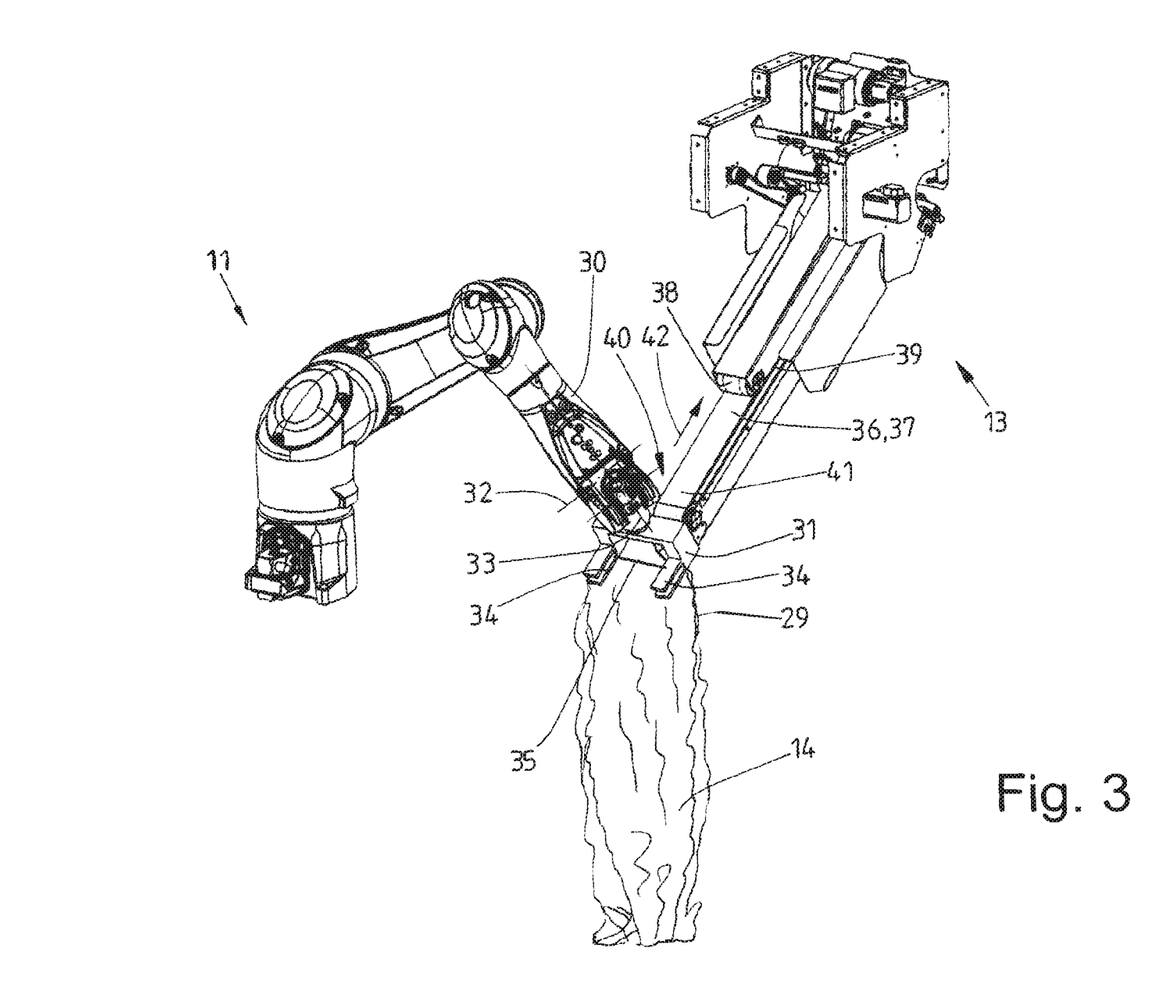
FIG. 3 shows the handling device, with an item of laundry hanging thereon, just before the latter is transferred to the loading conveyor.
Figure 4:
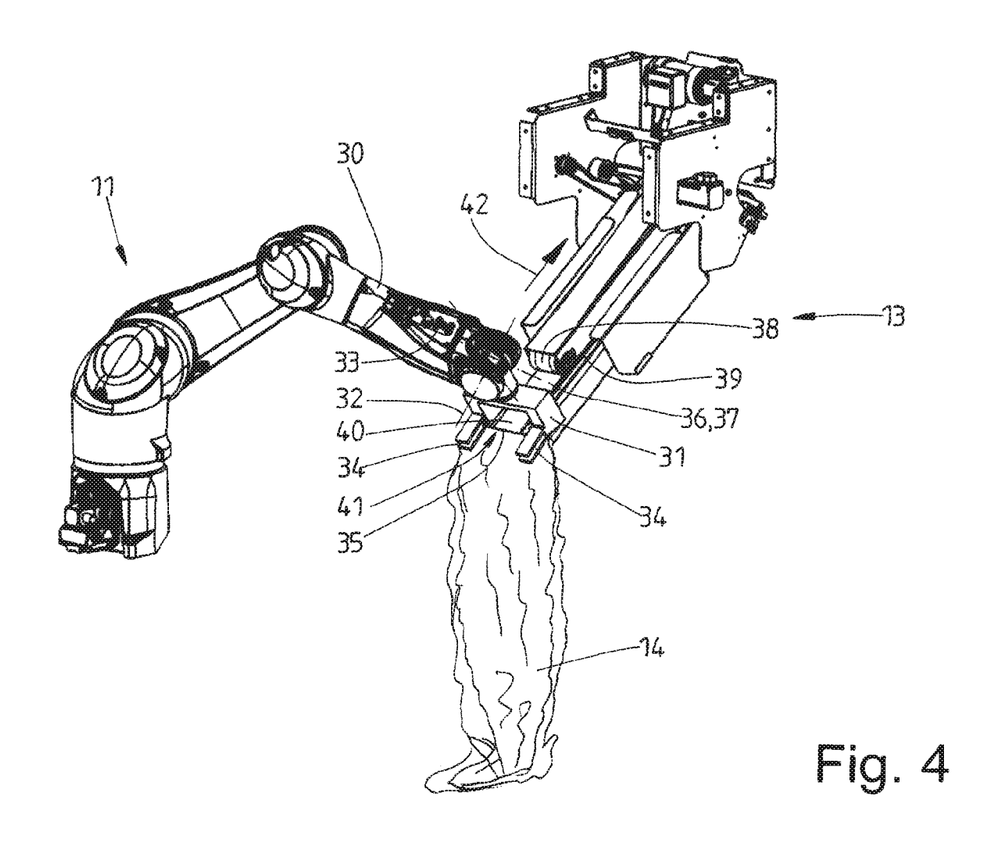
FIG. 4 shows a view analogous to FIG. 3 with the item of laundry being transferred to the loading conveyor by the handling device.

The item of laundry 14 hanging on the handling device 11 is transferred, by virtue of the individual arms, in particular the gripping arm 30, of the handling device 11 being correspondingly rotated, pivoted and preferably multiaxially repositioned in other ways, to that loading conveyor 13 of the feeding machine 12, or upstream of the feeding machine 12, on which the item of laundry 14 is to be positioned. It is also the case here that the double clip 31, with the item of laundry 14 hanging down from it, is rotated and pivoted. This takes place such that the open sides of the two mouths 34 of the double clip 31 are directed in the direction in which the upper strand 37 of the conveyor belt 36 is transported in the direction of the spreading device 17 (FIG. 3). Moreover, the clip mouths 34 and the double clip 31 are oriented such that they run parallel to the upper strand 37 of the conveyor belt 36 and the mutually facing inner sides of the clip mouths 34 are located on opposite longitudinal sides of the conveyor belt 36, in particular of the upper strand 37 thereof, at a small distance from the conveyor belt 36 (FIG. 4).

Once the handling device 11 has positioned the double clip 31, with the item of laundry 14 retained thereby in the above-described manner in front of the loading conveyor 13 which is to be charged with the item of laundry 14, the handling device 11 moves the double clip 31, with the item of laundry 14 hanging thereon, in the transporting direction 42 of the upper strand 37 of the conveyor belt 36. The peripheral portion 35, along with the adjoining portion of the item of laundry 14, retained between the mouths 34 of the double clip 31 passes between the mouths 34 of the clip onto the upper strand 37 of the loading conveyor 13 on or above the supporting region 41 (FIG. 4).

When the item of laundry 14 is located, by way of the peripheral portion 35 and the following region of the item of laundry 14, on or above the supporting region 41, the mouths 34 of the double clip 31 are opened and the handling device 11 moves the double clip 31 onward, with its mouths 34 open, in the transporting direction 42 of the conveyor belt 36 of the loading conveyor 13 until the item of laundry 14 has left the clip mouths 34. The transfer of the item of laundry 14 from the handling device 11 to the relevant loading conveyor 13 is then at an end. At this point the item of laundry 14 is located in an approximately U-shaped configuration on the conveyor belt 36 of the loading conveyor 13.

From the circulating conveyor belt 36 of the loading conveyor 13, the item of laundry 14 is transported to the spreading device 17 by way of the upper strand 37 of the conveyor belt 36, said upper strand being driven in the transporting direction 42. This transportation operation takes place, once the item of laundry has reached the upper, shorter and set-back conveyor belt 38, between the upper strand 37 of the conveyor belt 36 and the lower strand 39 of the conveyor belt 38.

The transfer of the item of laundry 14 from the handling device 11 to the supporting region 41 of the selected loading conveyor 13 can take place while the conveyor belts 36 and/or 38 are being driven in rotation. This then results in pretty much uninterrupted transfer of the item of laundry 14 from the double clip 31 of the handling device 11 to the loading conveyor 13. It is also conceivable, however, for the item of laundry 14 to be transferred from the handling device 11 to the relevant loading conveyor 13 while the conveyor belt 36 and/or 38 are/is at a standstill. In this case, the supporting region 41 at the front end of the upper strand 37 of the conveyor belt 36 is at a standstill for a brief period during the transfer operation while the peripheral portion 35, with the adjacent region of the item of laundry 14, is being set down on the supporting region 41.

It is also conceivable, for the purpose of releasing the item of laundry 14 or the double clip 31, for the clip mouths 34 to be opened, preferably for the lower half of each clip mouth 34 to be pivoted downwards through more or less 90 degrees, so that, once the clip mouths 34 have been opened, the double clip 31, as seen in relation to the surface of the supporting region 41, is merely moved upwards by the handling device 11, or as an alternative is moved upwards and forward in the transporting direction 42. The above-described possibilities for moving the open double clip 31 away from the item of laundry 14 set down on the supporting region 41 of the loading conveyor 13 are suitable particularly for uninterrupted transfer of the item of laundry 14 from the handling device 11 to the relevant loading conveyor 13.

The invention is not restricted to the above-described operation of items of laundry 14 being fed to the feeding machine 12 by a handling device 11 designed, for example, in the form of a robot. Rather, the invention is also suitable for a handling device 11 to feed items of laundry 14 to other laundry machines. It is also the case that it is not imperative for the items of laundry 14 to be separated by a separating device 15. It is also possible for the items of laundry 14 to come from any desired transporting system or from a sorting device.

LIST OF REFERENCE NUMERALS 10 supply conveyor
11 handling device
12 feeding machine
13 loading conveyor
14 item of laundry
15 separating device
16 conveyor
17 spreading device
18 conveying rail
19 clip carriage
20 clip
21 corner
22 corner
23 diagonal
24 free corner
25 free corner
26 periphery
27 periphery
28 periphery
29 periphery
30 gripping arm
31 double clip
32 pivot axis
33 axis of rotation
34 clip mouth
35 peripheral portion
36 conveyor belt
37 upper strand
38 conveyor belt
39 lower stand
40 end
41 supporting region
42 transporting direction
43 Imaging device

What is claimed is:

1. A method for feeding items of laundry to at least one loading conveyor, comprising transferring a respective separated item of laundry to the at least one loading conveyor, wherein the respective item of laundry is transferred to the respective loading conveyor by a handling device.

2. The method as claimed in claim 1, wherein the handling device receives the respective item of laundry in a state in which the respective item of laundry is retained in a stretched manner at two corners of the respective item of laundry.

3. The method as claimed in claim 1, wherein the handling device positions the respective item of laundry on the loading conveyor provided.

4. The method as claimed in claim 1, wherein the handling device positions the respective item of laundry on an initial region of a conveyor belt of the respective loading conveyor.

5. The method as claimed in claim 1, wherein the handling device receives a lower periphery of the respective item of laundry hanging down freely from two retained corners of the respective item of laundry.

6. The method as claimed in claim 5, wherein the item of laundry is retained in a stretched state at two diagonally opposite corners and a rectilinear lower periphery forms on the item of laundry hanging down from the two retained corners, the handling device grasping the item of laundry at the rectilinear lower periphery.

7. The method as claimed in claim 1, wherein the handling device grips the respective item of laundry between the adjacent corners of a hanging-down periphery.

8. The method as claimed in claim 7, wherein the handling device, for the purpose of gripping a portion of the hanging-down periphery of the respective item of laundry, is controlled on the basis of image data recorded by means of at least one imaging device.

9. The method as claimed in claim 7, wherein the handling device grips a central portion of the hanging-down periphery of the respective item of laundry.

10. The method as claimed claim 9, wherein a double clip of the handling device receives a lower periphery of the hanging-down periphery of the respective item of laundry.

11. An apparatus for feeding items of laundry to a laundry-treatment device having a supply conveyor and a feeding machine, the feeding machine having at least one loading conveyor, and further comprising a handling device arranged between the supply conveyor and the at least one loading conveyor.

12. The apparatus as claimed in claim 11, wherein the supply conveyor is assigned at least one imaging device, which detect in a contactless manner at least the position and orientation of at least a periphery of a respective item of laundry which is to be gripped, and received, by the handling device.

13. The apparatus as claimed in claim 11, wherein the handling device comprises a gripping arm, wherein one end of the gripping arm of the handling device is assigned a double clip having two spaced-apart mouths, wherein the double clip is movable multi-axially in space by the gripping arm of the handling device.

14. The apparatus as claimed in claim 11, wherein an upper strand of a lower conveyor belt of the loading conveyor has a supporting region for part of the respective item of laundry.

15. The apparatus as claimed in claim 11, wherein the supply conveyor has at least two displaceable clips for retaining and stretching out two corners of a respective item of laundry.

16. The apparatus as claimed in claim 15, wherein the at least two displaceable clips of the supply conveyor are displaceable independently of one another.

17. The apparatus as claimed in claim 15, wherein the two displaceable clips of the supply conveyor retain, and stretch out, diagonally opposite corners of the respective item of laundry.

18. The apparatus as claimed in claim 11, wherein the at least one loading conveyor is a belt conveyor, wherein, in the case of a plurality of loading conveyors spaced apart one beside the other, all the loading conveyors are belt conveyors.

19. The apparatus as claimed in claim 18, wherein each loading conveyor has at least one narrow conveyor belt, of which the width is smaller than the distance between the two mouths of the double clip of the handling device.

20. The apparatus as claimed in claim 18, wherein an upper strand of a lower conveyor belt of the at least one loading conveyor has a supporting region for part of a respective item of laundry.

* * * * *